R. B. Anderson,

Harness Clasp.

No. 3,216. Reissued Dec. 1, 1868.

Witnesses:
Leopold Finch
S. M. Rose

Inventor.
R. B. Anderson
per
Alexander Hasson
Att'y's

N. PETERS, PHOTO-LITHOGRAPHER, WASHINGTON, D. C.

UNITED STATES PATENT OFFICE.

R. B. ANDERSON, OF ONEIDA, ILLINOIS.

IMPROVEMENT IN SECURING BUCKLES AND RINGS TO HARNESS.

Specification forming part of Letters Patent No. 79,180, dated June 23, 1868; Reissue No. 3,216, dated December 1, 1868.

*To all whom it may concern:*

Be it known that I, R. B. ANDERSON, of Oneida, in the county of Knox, and in the State of Illinois, have invented certain new and useful Improvements in Mode of Securing Buckles, Rings, or Snap-Hooks to Harness; and do hereby declare that the following is a full, clear, and exact description thereof, reference being had to the accompanying drawings, and to the letters of reference marked thereon.

The nature of my invention consists in securing buckles, rings, or snap-hooks to leather straps by means of a tapering metallic box, provided with pegs or their equivalent, as will hereinafter be more fully set forth.

In order to enable others skilled in the art to which my invention appertains to make and use the same, I will now proceed to describe its construction and operation, referring to the annexed drawings, which form a part of this specification, and in which—

Figure 1:
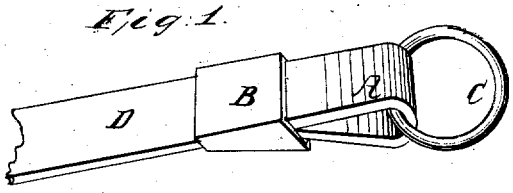
Figure 2:
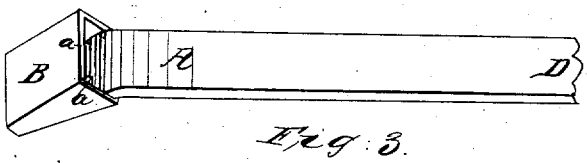
Figure 3:
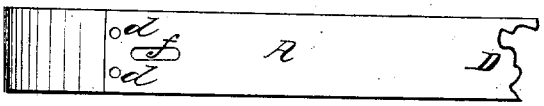
Figure 4:
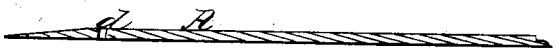
Figure 5:
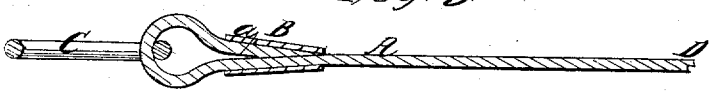
Figure 6:
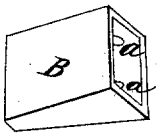

Figure 1 shows a ring secured to a leather strap. Fig. 2 shows one end of the strap inserted in the metallic box. Fig. 3 is a plan view of the strap prepared for insertion in the box; Fig. 4, an edge or side view of the same; Fig. 5, a side view, in section, of Fig. 1; and Fig. 6 is a perspective of the metal box.

A represents any leather strap to which it is desired to secure a ring, buckle, or snap-hook. B represents a metallic box or loop, which is made open at both ends, and which is tapering or flaring in shape, as shown in Figs. 2 and 6.

The box B is provided with two pegs or teats *a a*, cast on the inside of the same and a suitable distance from the flaring end, said pegs or teats extending about half the distance across the box.

In using this loop or box B, the strap A is cut in a tapering or wedge shape at its end, as seen in Fig. 4, and two holes, *d d*, are punched in the strap at the base of the taper and near its end, as shown in Fig. 3. The wedge end of the strap A is put into the flaring end of the loop or box B, and the pegs *a a* pass into the holes *d d*, as seen in Fig. 2.

The ring C is then placed on the strap; then take the end of the strap marked D and pass it through the loop or box B, and over the ends of the pegs or teats *a a*, as seen in Fig. 1. Then draw the strap through firmly, the strap passing through the box B, and close on the ends of the pegs *a a*, as shown in Fig. 5, thereby preventing any possibility of the tapered or wedge end of the strap from slipping off the pegs.

A snap-hook is secured in exactly the same manner; and when it is desired to secure a buckle, an oblong slot, *f*, is punched in the strap, as shown in Fig. 3, to receive the tongue of the buckle.

Having thus fully described my invention, what I claim as new, and desire to secure by Letters Patent, is—

Securing buckles, rings, and snap-hooks to leather straps by means of a tapering metallic box, B, secured by pegs or teats *a a*, or their equivalents, whereby the ends of the strap are inclosed, as specified.

In testimony that I claim the foregoing I have hereunto set my hand this 20th day of October, 1868.

R. B. ANDERSON.

Witnesses:
C. W. METCALF,
LEOPOLD EVERT.